Sept. 22, 1964  E. WHEELER  3,149,687
COTTON GIN SCALES

Filed Oct. 18, 1962  2 Sheets-Sheet 1

*Earl Wheeler*
INVENTOR.

BY *Clarence A. O'Brien*
*and Harvey B. Jacobson*
Attorneys

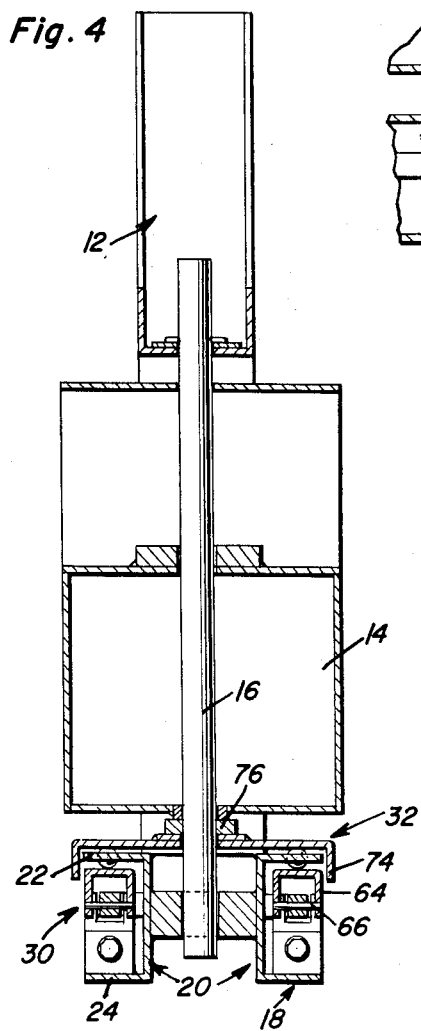
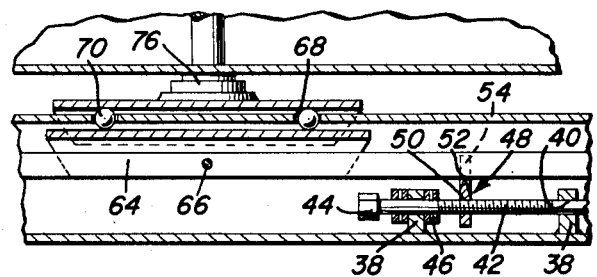
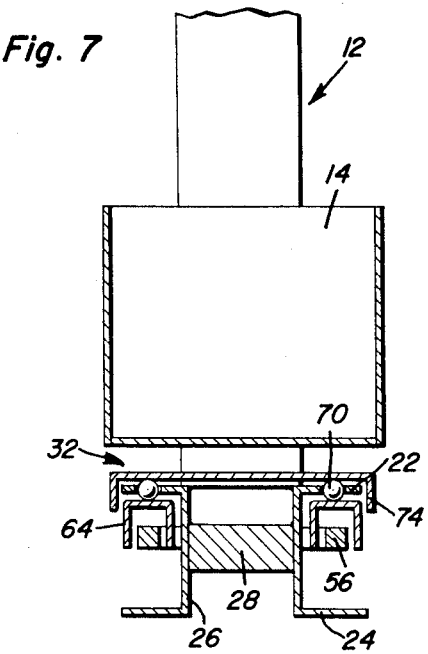
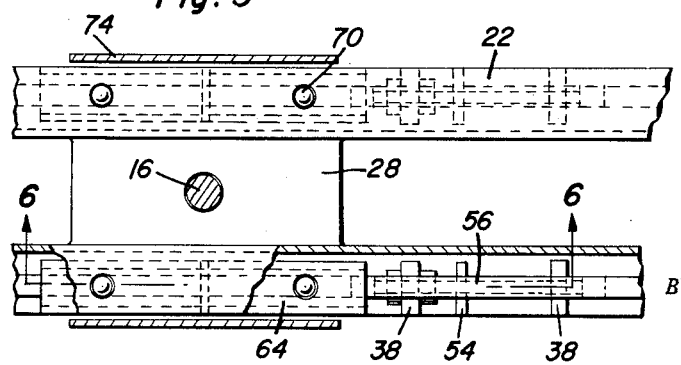
Earl Wheeler
INVENTOR.

United States Patent Office 3,149,687
Patented Sept. 22, 1964

3,149,687
COTTON GIN SCALES
Earl Wheeler, 2407–B 48th St., Lubbock, Tex., assignor of ten percent to William J. Gillespie, Lubbock, Tex.
Filed Oct. 18, 1962, Ser. No. 231,430
4 Claims. (Cl. 177—132)

The present invention generally relates to cotton gins, and more particularly to a novel scale means incorporated directly into the gin structure so as to enable a substantially accurate weighing of the cotton before it is actually compressed and bound into a bale.

It is a primary intention of the present invention to provide a scale means mounted on a cotton gin in a manner so as to enable the weighing of the cotton as it is packed within the conventionally provided box or hamper by the press, this press being of either an up-press type or a down-press type.

In conjunction with the above object, it is contemplated that the means of the present invention be capable of accurately indicating the weight of the cotton on the off or non-pressing stroke of the press.

Additionally, it is intended that the scale means of the present invention enable a weighing of the cotton with little or no delay in the processing thereof.

Furthermore, it is contemplated that the scale means of the present invention be of the counterweight type capable of withstanding relatively rough treatment over extended periods of time with little or no maintenance being required.

In addition, an object of the present invention resides in the provision of a scale which is relatively simple in construction and capable of being easily and quickly mounted beneath the hamper, requiring only a minimum amount of space for this mounting.

These together with other objects and advantages which will become subsequently apparent reside in the details of construction and operation as more fully hereinafter described and claimed, reference being had to the accompanying drawings forming a part hereof, wherein like numerals refer to like parts throughout.

FIGURE 4 is a vertical cross-sectional view taken substantially on a plane passing along line 4—4 in FIGURE 1;

FIGURE 5 is a partial cross-sectional view taken substantially on a plane passing along line 5—5 in FIGURE 1;

FIGURE 6 is a partial cross-sectional view taken substantially on a plane passing along line 6—6 in FIGURE 5; and FIGURE 7 is a partial cross-sectional view taken substantially on a plane passing along line 7—7 in FIGURE 1.

Figure 1:
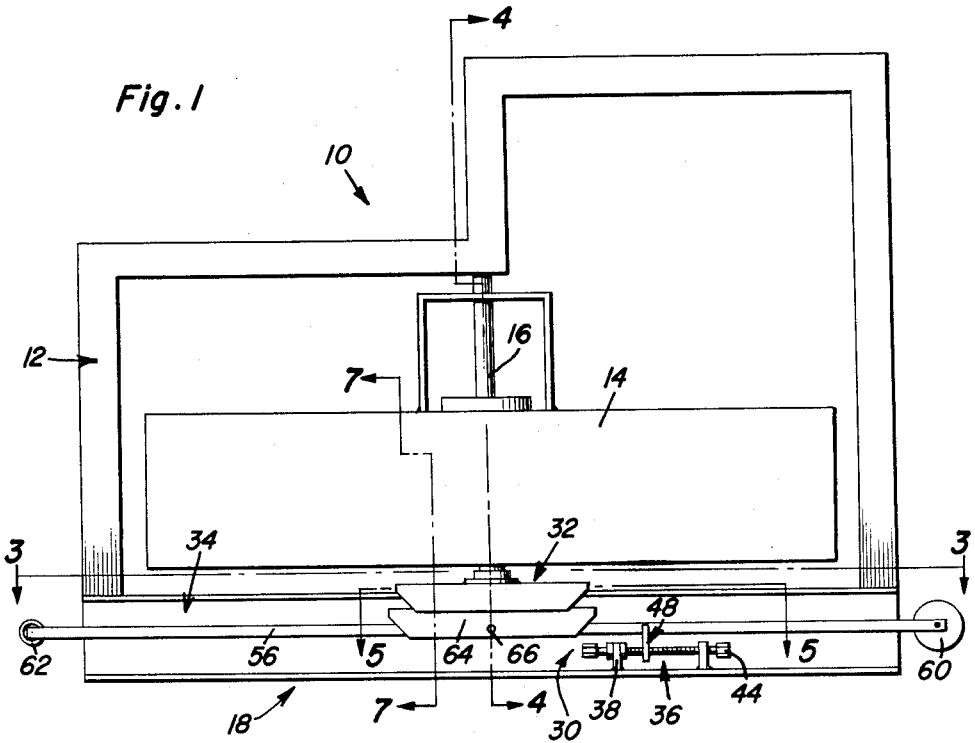
FIGURE 1 is a side elevational view of the hamper portion of a conventional gin with the scale means of the present invention mounted thereon.
Figure 2:
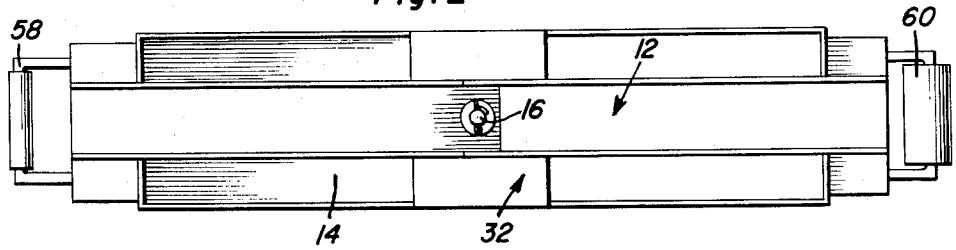
FIGURE 2 is a top plan view of the structure in FIGURE 1.
Figure 3:
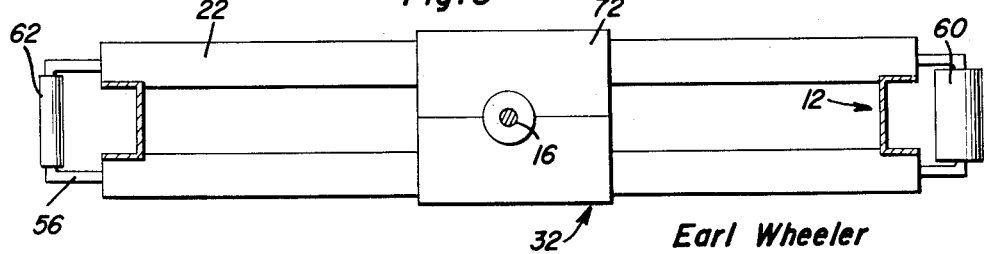
FIGURE 3 is a cross-sectional view taken substantially on a plane passing along line 3—3 in FIGURE 1.

Referring now more particularly to the drawings, reference numeral 10 generally indicates the conventionally provided portion of the gin with which the present invention is concerned. This portion of the gin consists of an outer frame 12 and a box or hamper 14 rotatably mounted within the frame 12 on a vertically extending shaft 16 extending vertically through the frame 12, the cotton being conventionally packed within the hamper 14 by either an up-press or down-press (not illustrated).

The lower horizontal portion 18 of the frame 12 consists of two parallely extending outwardly facing channel portions 20 including upper and lower horizontal flanges 22 and 24 and a vertical web 26, the webs 26 of each channel-shaped portion 20 being interconnected, intermediate the length of the portion 18, by a relatively thick rectangular plate 28. As will be appreciated, the plate 28 is suitably apertured so as to allow for the passage of the shaft 16 therethrough.

The scale means 30 comprising the present invention is mounted directly on this lower horizontal portion 18 of the frame 12 and consists essentially of a weight-receiving platform 32, weight arm 34, and adjustable pivot supports 36.

The adjustable pivot supports 36 are provided on both lower flanges 24 in transverse alignment with each other and slightly to the rear of the shaft 16. These supports 36 each consist of two upright lugs 38 welded to the bottom flange 24 at longitudinally spaced points and having aligned apertures 40 therethrough for the rotational reception therein of the unthreaded ends of a threaded rod 42. This rod 42 has enlarged polygonal heads 44 at each end thereof so as to facilitate the rotation of the rod within the aligned apertures 40, collar means 46 being fixed to the rod 42 on opposite sides of one of the lugs 38 so as to prevent longitudinal movement of the rod while allowing the rotational movement thereof. Mounted on the threaded portion of the rod 42 for lateral movement in response to a turning of the rod 42 is an upright plate member 48 having an internally threaded aperture 50 therethrough threadedly receiving the threaded portion of the rod 42. This plate 48 is provided with a centrally located upwardly directed knife edge 52 providing the pivot point for the weight arm 34 as shown and which shall be described presently. Further, it will be noted that the plates 48 also include two upwardly extending legs 54 located on each side of the knife edge 52 so as to embrace a portion of the weight arm 34 thus maintaining the plate 48 vertically so as to prevent the rotation thereof and enable the lateral adjustment of the position of this plate 48 by the aforementioned rotation of the threaded rod 42.

While the above manner of providing for the lateral adjustment of the knife edge pivot support has been described in detail, it will also be appreciated that this lateral adjustment can be accomplished by having the end portions of the rod 42 threadedly received within the lug apertures so as to enable a lateral movement of the entire rod, the plate 48, in this instance, being secured to a central portion of the rod 42 against lateral movement relative to the rod 42, the lateral movement of the plates 48 being effected by a lateral movement of the entire rod 42.

The weight arm 34 consists of two spaced parallel elongated side members 56, both of a length so as to extend beyond the bottom portion 18 of the frame 12 at both ends thereof with the ends of these side members 56 being interconnected by two transverse end members 58, the end member 58 on the support means 36 side of the frame 12 having a counterweight 60 thereon and the other end member 58 having suitable means 62 thereon for communicating with any conventional weight indicator so as to record the weight of the cotton contained in the hamper 14.

The side members 56 are each supported on the knife edge 52 between the legs 54 of the plate 48 of one of the supports 36.

Located forward of the supports 36 and in vertical alignment with the shaft 16 are two inverted elongated U-shaped members 64 pivotally mounted on the side members 56 by a transversely extending pin 66 extending through aligned apertures in the adjacent side member 56 and depending legs of the member 64.

Located in the flange 22 immediately above each member 64 are two apertures 68 equally spaced from the vertical center line of the shaft 16 which incidentally corresponds with the location of the pivot pin 66, these apertures 68 being of a size so as to freely receive ball-bearings 70 therein, these ball-bearings 70 resting on the upper surface of the member 64 and projecting above the upper surface of the flange 22.

The weight-receiving platform 32, as will be appreciated from the drawings, is supported directly on the upper portion of the ball-bearings 70 out of contact with the upper surface of the flanges 22. In order to facilitate the location of this platform 32 about the shaft 16, it is contemplated that the platform 32 be formed into similar halves 72 with the halves 72 being first located about the shaft 16 and subsequently secured in any suitable manner such as by welding, each half 72 including a downwardly depending outer flange 74 enclosing the subjacent ball-bearing support means. Further, it will be appreciated that in order to maintain the desired rotation of the hamper 14, a suitable bearing means 76 will be provided between the bottom of the hopper 14 about the shaft 16 and the upper surface of the weight receiving platform 32.

From the foregoing, it is considered to be readily apparent that a novel scale means has been defined which can be quickly incorporated directly into a cotton gin structure so as to accurately weigh the cotton as it is pressed in the conventionally provided hamper with it being contemplated that the actual weighing operation take place on the off-stroke of the press, this either being the upstroke on a down-press or the downstroke on an up-press. Also, it will be recognized that the scale means of the present invention, being generally of the counterweight type, will be capable of constant use over long periods of time with no maintenance being required other than a possible adjustment of the pivot point to compensate for variations in the hamper weight and so as to constantly maintain the empty hamper in equilibrium with the counterweight, thus insuring an accurate weighing of the cotton to be introduced into the hamper.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a cotton gin having a cotton receiving hamper rotatably mounted on a vertically extending shaft and a frame surrounding said hamper, said frame including a horizontal lower member extending beneath said hamper, said lower member consisting of two elongated outwardly facing spaced parallel channel-shape beams having upper and lower flanges, scale means mounted on said lower member, said scale means including a weight receiving platform located centrally beneath said hamper and in weight receiving relation thereto, an elongated balance arm located beneath said platform and in weight receiving relation thereto, a pivot support means for said arm mounted on said lower member, said support means being located closer to one end of said arm than said platform, and a counterweight on said one end of the arm.

2. The combination of claim 1 wherein said pivot support means consists of two transversely aligned supports, one secured to the lower flange of each beam, said supports each including a vertical plate having a horizontally extending balance line on the upper edge thereof, and said balance arm consists of two spaced rod-like members, one extending along each channel-shaped beam, each rod-like member being balanced on one of said vertical plates.

3. The combination of claim 2 wherein said supports each further include two vertically extending longitudinally spaced lugs secured to the bottom flange of the adjacent beam, aligned apertures in said lugs, and a longitudinally extending adjusting rod supported in said apertures, said vertical plate being supported on an intermediate portion of said adjusting rod and being laterally adjustable thereby.

4. The combination of claim 3 wherein said weight receiving platform is of a width so as to span the upper flanges of the two channel-shaped members, first and second members of a length approximately equal to the length of said platform and each of a width slightly greater than the width of a rod-like member, said first and second members each including two depending legs interconnected at their upper edges by a horizontal web, each of the first and second members being positioned about one of said rod-like members in alignment with said platform, the legs of each member being orientated on opposite sides of the associated rod-like member, and the web of the member being positioned above the upper surface of the rod-like member, a pin extending through aligned apertures in said legs and the rod-like member pivotally mounting the member on the rod-like member, aligned apertures in the upper flange of each beam above the web, said last mentioned apertures being horizontally spaced an equal distance on each side of the pin, and ball bearings located in each of the last mentioned apertures and supported on said web, said ball bearings extending upward beyond the upper surface of the upper flange, and the platform being supported on said ball bearing above the upper flanges.

References Cited in the file of this patent
UNITED STATES PATENTS
928,491    Bottcher _____ July 20, 1909